US012780619B2

(12) United States Patent
Kiji

(10) Patent No.: US 12,780,619 B2
(45) Date of Patent: Nov. 3, 2026

(54) CRANE POSITION DETERMINATION DEVICE, MOBILE CRANE, AND CRANE POSITION DETERMINATION METHOD

(71) Applicant: TADANO LTD., Kagawa (JP)

(72) Inventor: Marudan Kiji, Kagawa (JP)

(73) Assignee: TADANO LTD., Kagawa (JP)

( * ) Notice: Subject to any disclaimer, the term of this patent is extended or adjusted under 35 U.S.C. 154(b) by 226 days.

(21) Appl. No.: 18/016,171

(22) PCT Filed: Jul. 27, 2021

(86) PCT No.: PCT/JP2021/027636
§ 371 (c)(1),
(2) Date: Jan. 13, 2023

(87) PCT Pub. No.: WO2022/025023
PCT Pub. Date: Feb. 3, 2022

(65) Prior Publication Data
US 2023/0271812 A1 Aug. 31, 2023

(30) Foreign Application Priority Data
Jul. 27, 2020 (JP) ................................ 2020-126487

(51) Int. Cl.
*B66C 13/46* (2006.01)
*B66C 23/42* (2006.01)
(Continued)

(52) U.S. Cl.
CPC .............. *B66C 13/46* (2013.01); *B66C 23/78* (2013.01); *G06N 3/092* (2023.01); *B66C 23/42* (2013.01); *B66C 2700/0371* (2013.01)

(58) Field of Classification Search
CPC ......... B66C 13/46; B66C 23/42; B66C 23/78; B66C 2700/0371
See application file for complete search history.

(56) References Cited

U.S. PATENT DOCUMENTS 5,548,512 A * 8/1996 Quraishi .............. G05D 1/0255 706/905
5,719,955 A * 2/1998 Mita ...................... G06N 3/045 706/41
(Continued)

FOREIGN PATENT DOCUMENTS

CN 101428735 A 5/2009
CN 102515022 A 6/2012
(Continued)

OTHER PUBLICATIONS

Oct. 19, 2021, International Search Report issued for related PCT Application No. PCT/JP2021/027636.
(Continued)

*Primary Examiner* — Fadey S. Jabr
*Assistant Examiner* — Mario C Gonzalez
(74) *Attorney, Agent, or Firm* — Paratus Law Group, PLLC

(57) ABSTRACT

There is provided a crane position determination device that is to be mounted on a mobile crane, the crane position determination device including: an input unit that receives input of the working conditions of crane work; a determination unit that has a learning model and determines the placement position of the mobile crane on the basis of output from the learning model; and a notification unit that provides notification of the placement position of the mobile crane, wherein on the basis of a reward function including at least one evaluation function pertaining to the crane work, the learning model learns to output information pertaining to the optimum placement position of the mobile crane with respect to the working conditions.

9 Claims, 10 Drawing Sheets

(51) Int. Cl.
*B66C 23/78* (2006.01)
*G06N 3/092* (2023.01)

(56) References Cited

U.S. PATENT DOCUMENTS

| | | | | |
|---|---|---|---|---|
| 6,272,449 | B1 * | 8/2001 | Passera | G06F 18/213 703/2 |
| 9,302,890 | B1 * | 4/2016 | Vogt | B66C 15/045 |
| 2013/0079974 | A1 * | 3/2013 | Stake | B66C 13/46 701/33.1 |
| 2016/0003266 | A1 * | 1/2016 | Imura | F15B 11/04 60/428 |
| 2016/0119589 | A1 * | 4/2016 | Tanizumi | H04N 23/635 345/173 |
| 2019/0003152 | A1 * | 1/2019 | Nakamura | E02F 9/264 |
| 2019/0300339 | A1 * | 10/2019 | Kawai | B66C 13/16 |
| 2020/0150599 | A1 | 5/2020 | Tsuneki et al. | |
| 2020/0257252 | A1 * | 8/2020 | Tsuneki | G05B 13/042 |
| 2021/0206605 | A1 * | 7/2021 | Rotem | B66C 13/063 |
| 2021/0347288 | A1 * | 11/2021 | Rösth | B66C 23/88 |
| 2021/0354960 | A1 * | 11/2021 | Faloney, Jr. | B66C 3/04 |

FOREIGN PATENT DOCUMENTS

| | | | | |
|---|---|---|---|---|
| JP | 2018-080053 A | | 5/2018 | |
| JP | 2018-095372 A | | 6/2018 | |
| JP | 2018-203469 A | | 12/2018 | |
| WO | WO-2019073456 A1 | * | 4/2019 | B66C 23/90 |

OTHER PUBLICATIONS

Oct. 19, 2021, International Search Opinion issued for related PCT Application No. PCT/JP2021/027636.

* cited by examiner

*FIG. 3*

11

| START POINT Ps | END POINT Pe | LOAD mr | WORK REGION M | TURNING EFFICIENCY Pr | DERRICKING EFFICIENCY Pl | WINCH EFFICIENCY Pw | TEMPERATURE T | WIND SPEED W | WIND DIRECTION Vwxz |
|---|---|---|---|---|---|---|---|---|---|
| $x_s, y_s, z_s$ | $x_e, y_e, z_e$ | $m_a$ | $(x_a, y_a)$, $(x_b, y_b)$, ··· | $P_{ra}$ | $P_{la}$ | $P_{wa}$ | $T_a$ | $W_a$ | $x_v, y_v, z_v$ |

FIG. 7

| START POINT Ps | END POINT Pe | LOAD mr | WORK REGION M | TURNING EFFICIENCY Pr | DERRICKING EFFICIENCY Pl | WINCH EFFICIENCY Pw | TEMPERATURE T | WIND SPEED W | WIND DIRECTION Vwxz | |
|---|---|---|---|---|---|---|---|---|---|---|
| xs1,ys1,zs1 | xe1,ye1,ze1 | mr1 | (xa1,ya1), (xb1,yb1), ... | Pr1 | Pl1 | Pw1 | T1 | W1 | xv1,yv1,zv1 | 46 |
| xs2,ys2,zs2 | xe2,ye2,ze2 | mr2 | (xa2,ya2), (xb2,yb2), ... | Pr2 | Pl2 | Pw2 | T2 | W2 | xv2,yv2,zv2 | 46 |

...

CRANE POSITION DETERMINATION DEVICE, MOBILE CRANE, AND CRANE POSITION DETERMINATION METHOD

CROSS REFERENCE TO PRIOR APPLICATION

This application is a National Stage Patent Application of PCT International Patent Application No. PCT/JP2021/027636 (filed on Jul. 27, 2021) under 35 U.S.C. § 371, which claims priority to Japanese Patent Application No. 2020-126487 (filed on Jul. 27, 2020), which are all hereby incorporated by reference in their entirety.

TECHNICAL FIELD

The present invention relates to a crane position determination device, a mobile crane, and a crane position determination method.

BACKGROUND ART

In crane work, it is difficult to install a mobile crane at an appropriate position. For this reason, some mobile cranes include a control device that warns an operator of a region not suitable for crane work.

For example, Patent Literature 1 discloses a mobile crane including a positioning device that receives a signal of a positioning satellite and measures a current position, and a control device that acquires ground information about the current position measured by the positioning device by a wireless means and issues a warning when determining that a work region is an alarm region from the acquired ground information.

CITATION LIST

Patent Literature

Patent Literature 1: JP 2018-95372 A

SUMMARY OF THE INVENTION

Problems to be Solved by the Invention

In crane work, it is desired to install a mobile crane at an appropriate position with respect to a suspended load in order to enhance work efficiency.

However, in the mobile crane described in Patent Literature 1, the mobile crane can only be installed at an appropriate position based on ground information. Therefore, in this mobile crane, it is difficult to install the mobile crane at a position where efficiency of crane work is high. As a result, it is necessary to rely on the skills and experience of the operator.

The present invention has been made to solve the above problems, and an object thereof is to provide a crane position determination device, a mobile crane, and a crane position determination method capable of installing a mobile crane at a position where efficiency of crane work is high.

Solutions to Problems

One aspect of the crane position determination device according to the present invention is a crane position determination device mounted on a mobile crane, the crane position determination device including an input unit that receives an input of a working condition of crane work, a determination unit that has a learning model and that determines a placement position of the mobile crane based on an output of the learning model, and a notification unit that provides notification of the placement position of the mobile crane, wherein the learning model is a model that learns to output information pertaining to an optimum placement position of the mobile crane with respect to the working condition based on a reward function including at least one evaluation function pertaining to the crane work.

An aspect of the crane according to the present invention includes the crane position determination device described above.

One aspect of a crane position determination method according to the present invention includes a crane position determination method executed by a computer mounted on a mobile crane, the crane position determination method including the steps of receiving an input of a working condition of crane work, determining a placement position of the mobile crane based on an output of a learning model that learns to output information pertaining to an optimum placement position of the mobile crane with respect to the working condition based on a reward function including at least one evaluation function pertaining to the crane work, and providing notification of the placement position of the mobile crane.

Effects of the Invention

According to the configuration of the present invention, the mobile crane can be installed at a position where efficiency of crane work is high.

BRIEF DESCRIPTION OF DRAWINGS

FIG. 3 is a schematic diagram of a data set input to an input unit included in the position determination device according to the embodiment of the present invention.

FIG. 7 is a schematic diagram of a data set of a learning database included in the position determination device according to the embodiment of the present invention.

DESCRIPTION OF EMBODIMENTS

Figure 1:
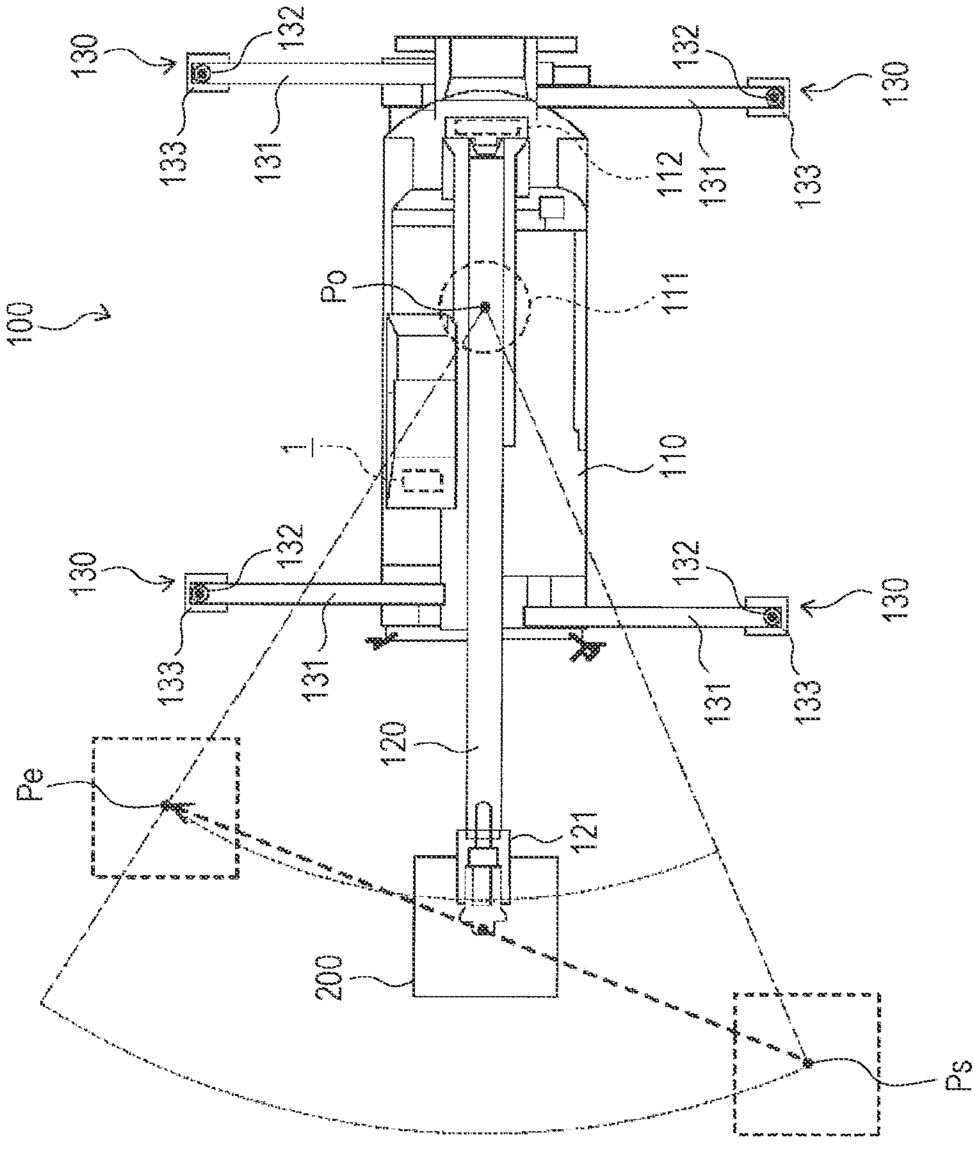
FIG. 1 is a top view of a rough terrain crane equipped with a position determination device according to an embodiment of the present invention.

Hereinafter, a crane position determination device, a mobile crane, a crane position determination method, and a program according to an embodiment of the present invention will be described in detail with reference to the drawings. In the drawings, the same or equivalent portions are denoted by the same reference numerals.

The mobile crane position determination device according to the embodiment is a device that determines the placement position (stop position) of the traveling body and the placement position (extension position) of the outrigger of the mobile crane when starting the work of carrying the suspended load, that is, the crane work.

In this position determination device, a learned model constructed by a neural network is used to determine the stop position of the traveling body. In addition, the extension position of the outrigger is determined using the learned model, and the extension width of the outrigger is calculated from the extension position.

First, a configuration of a mobile crane equipped with a position determination device will be described with reference to FIG. 1. Next, the configuration of the position determination device will be described together with the learned model with reference to FIGS. 2 to 7. Next, the position determination process performed by the position determination device will be described with reference to FIGS. 8 and 9.

FIG. 1 is a top view of a rough terrain crane 100 equipped with a position determination device 1 according to the embodiment. In FIG. 1, in order to facilitate understanding, the rough terrain crane 100 extends an outrigger 130 to extend a boom 120. Further, a suspended load 200 is attached to a hook (not illustrated).

As illustrated in FIG. 1, a rough terrain crane 100 includes a traveling body 110, the boom 120 for performing crane work, and the outrigger 130 for stabilizing the traveling body 110 during crane work.

Although not illustrated, the traveling body 110 has a wheel rotationally driven by a motor. The boom 120 illustrated in FIG. 1 is mounted on the traveling body 110. The traveling body 110 moves to a desired position by the motor rotationally driving the wheel. The traveling body 110 enables crane work using the boom 120 at the desired position.

The boom 120 is configured by a telescopic boom, that is, a telescopic cylindrical boom. The end thereof is provided in the traveling body 110, and is supported by a turning body 111 that turns by a turning motor. The boom 120 is supported by a derricking cylinder provided on the turning body 111 so as to be raised and lowered. As a result, the boom 120 turns with respect to the traveling body 110 and can be raised and lowered at the turning position.

A boom head 121 is provided at a distal end of the boom 120. Although not illustrated, in the boom head 121, a rope whose tip is tied to a hook hangs down from the sheave. The turning body 111 is provided with a winch 112 that winds up and winds down the rope. As a result, the boom 120 can lift and suspend the suspended load 200.

A total of four outriggers 130 are provided on the front, rear, left, and right sides of the traveling body 110. Each of the outriggers 130 includes a beam 131 that can project in the left-right direction, a jack 132 provided to be extendable and retractable in the vertical direction, and a float 133 provided at the lower end of the jack 132. As a result, each of the outriggers 130 can extend the jack 132 by extending the beam 131 and grounds the float 133. The four outriggers 130 bring the floats 133 into contact with the ground to stabilize the traveling body 110 and prevent the rough terrain crane 100 from falling over.

The rough terrain crane 100 performs crane work as follows. First, when starting the work, the traveling body 110 is stopped near the suspended load 200. Then, the beam 131 of the outrigger 130 is extended, and the jack 132 is extended to ground the float 133.

Next, the boom head 121 is moved onto the suspended load 200 by performing each operation of raising and extending of the boom 120 and turning of the turning body 111. Thereafter, the suspended load 200 is attached to the hook, and the winch 112 is wound up to lift the suspended load 200.

Subsequently, the suspended load 200 is carried to a desired position by turning of the turning body 111, and extending and derricking of the boom 120, and the suspended load 200 is lowered.

In such crane work, the amount of turning of the turning body 111, the amount of extension of the boom 120, and the like change depending on the distance between the traveling body 110 and the suspended load 200 to be lifted. In addition, the lifting load and the maximum working radius change depending on the extension width (hereinafter, it is simply referred to as an extension width of the outrigger 130) of the beam 131 of the outrigger 130. Therefore, in order to enhance efficiency of the crane work, it is necessary for the operator of the rough terrain crane 100 to stop the traveling body 110 at an appropriate position and to extend the outrigger 130 to an appropriate extension width.

However, it is difficult for the operator to install the traveling body 110 at an appropriate placement position and install the outrigger 130 at an appropriate placement position.

Therefore, the rough terrain crane 100 is equipped with the position determination device 1 that determines a stop position of the traveling body 110 and a placement position (extension width) of the outrigger 130 in order to enhance efficiency of crane work. Next, a configuration of the position determination device 1 will be described with reference to FIGS. 2 to 7.

Figure 2:
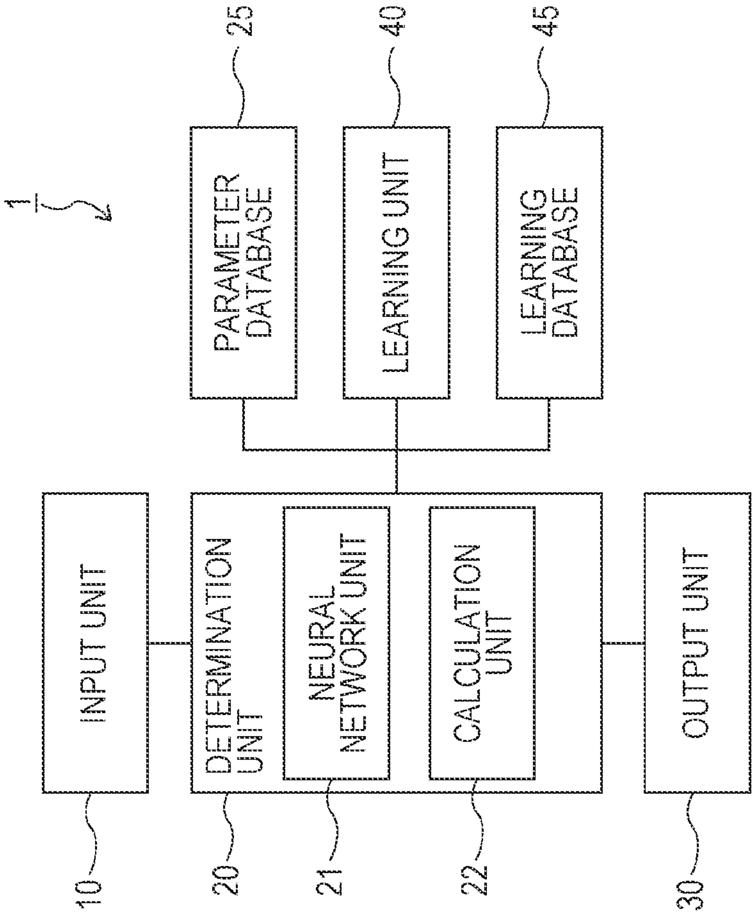
FIG. 2 is a functional block diagram of the position determination device according to the embodiment of the present invention.
Figure 4:
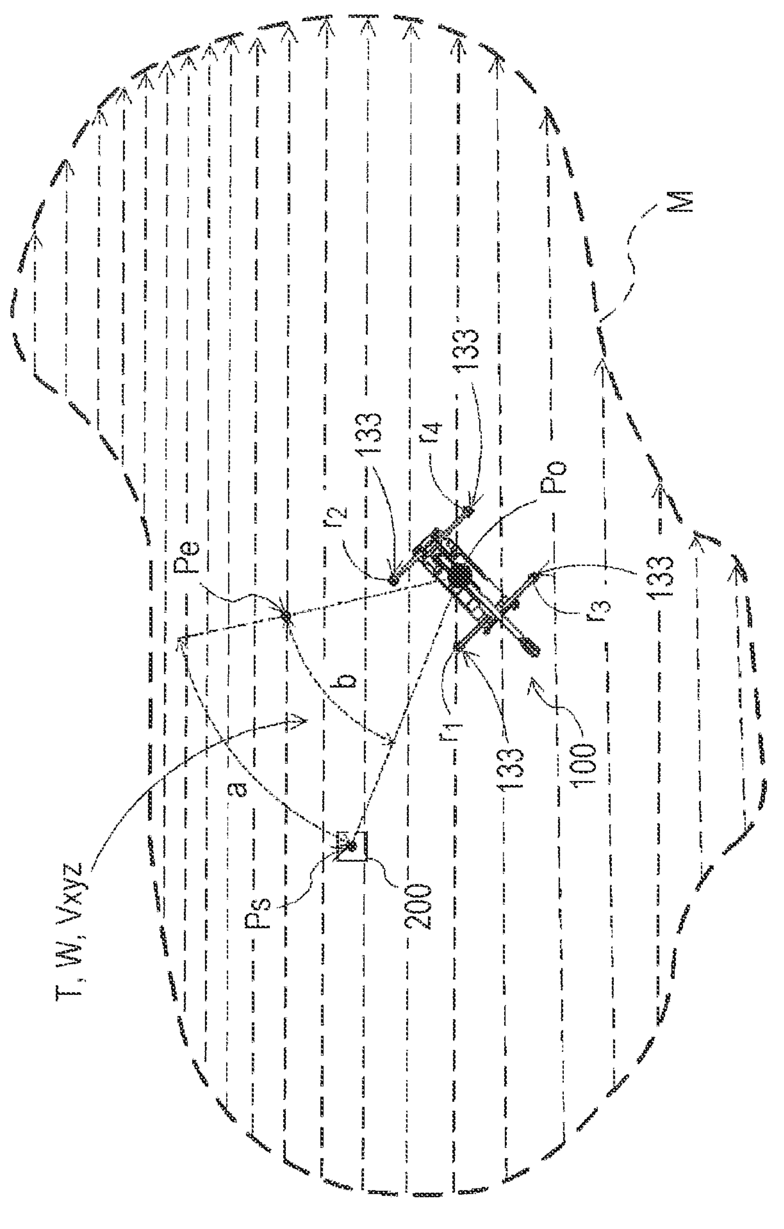
FIG. 4 is a conceptual diagram of a work region input to an input unit included in the position determination device according to the embodiment of the present invention.
Figure 5:
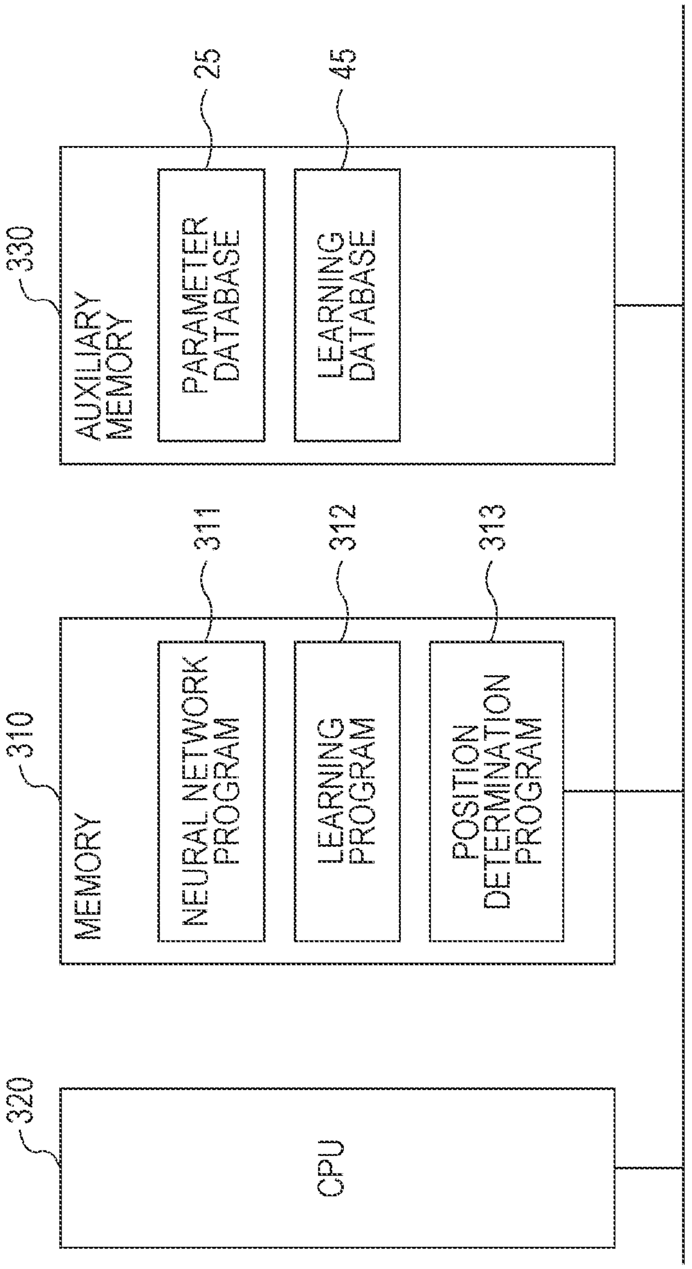
FIG. 5 is a hardware configuration diagram of a determination unit and a learning unit included in the position determination device according to the embodiment of the present invention.
Figure 6:
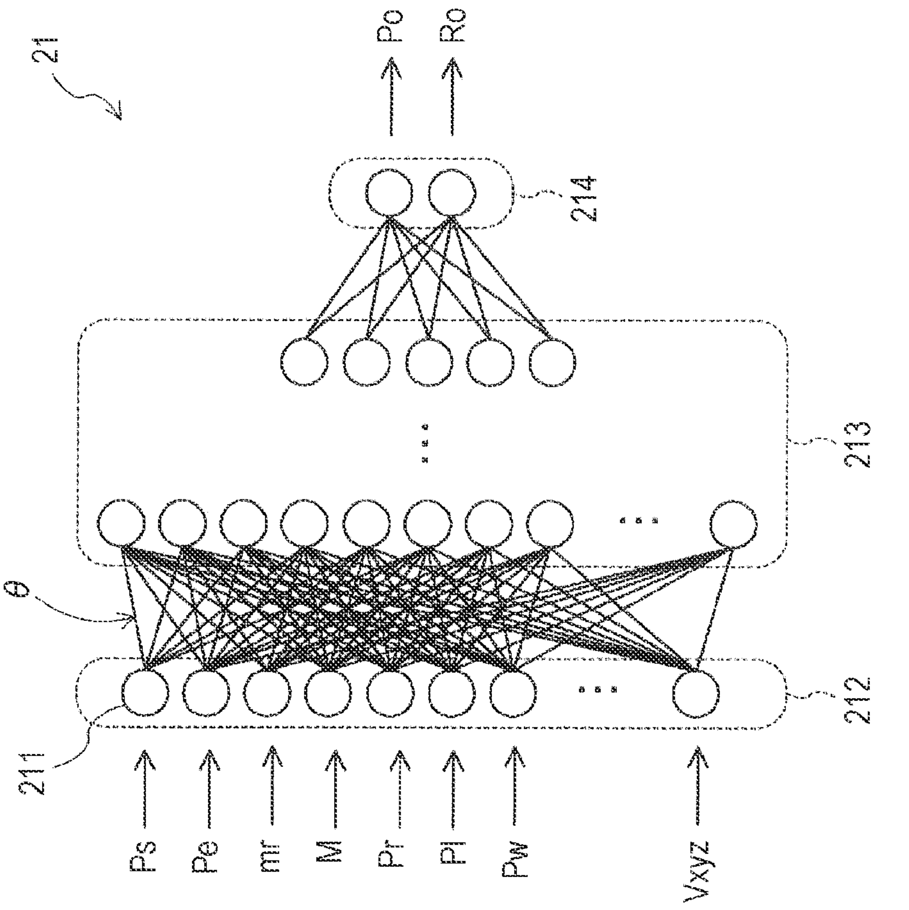
FIG. 6 is a conceptual diagram of a neural network unit included in the position determination device according to the embodiment of the present invention.

FIG. 2 is a functional block diagram of the position determination device 1 according to the embodiment. FIG. 3 is a schematic diagram of a data set 11 input to an input unit 10 included in the position determination device 1. FIG. 4 is a conceptual diagram of a work region M input to the input unit 10. FIG. 5 is a hardware configuration diagram of a determination unit 20 and a learning unit 40 included in the position determination device 1. FIG. 6 is a conceptual diagram of a neural network unit 21 included in the position determination device 1. FIG. 7 is a schematic diagram of the data set 11 of a learning database 45 included in the position determination device 1.

As illustrated in FIG. 2, the position determination device 1 includes the input unit 10 that inputs information on crane work, the determination unit 20 that includes the neural network unit 21 that processes the information input to the input unit 10 and determines a stop position (placement position) of the traveling body 110 and an extension position (placement position) of the outrigger 130, an output unit 30 that outputs the stop position and the extension position determined by the determination unit 20, and the learning unit 40 that causes the neural network unit 21 to perform learning.

The input unit 10 includes a keypad. The input unit 10 receives an input of the data set 11 illustrated in FIG. 3 by the user using the keypad. Note that the input unit is not limited to the keypad. The input unit may be configured to receive, for example, data stored in a storage unit (not illustrated) as input information.

Specifically, the input unit 10 receives an input of a working condition of crane work (carrying work) performed by the rough terrain crane 100. Specifically, the working conditions include the coordinates of the start point $P_s$ and the end point $P_e$, the load $m_r$ of the suspended load 200, the work region M in the site where the crane work is performed, and the operation efficiency (first operation efficiency) of the rough terrain crane 100 of the scheduled crane work illustrated in FIG. 4. The operation efficiency of the rough terrain crane 100 includes the turning efficiency $P_r$ of the turning body 111, the derricking efficiency $P_l$ of the boom 120, and/or the winch efficiency $P_w$. The working conditions may include the air temperature T, the wind speed W, and the wind direction $V_{XYZ}$ of the work region M.

Here, the start point $P_s$ corresponds to an example of information pertaining to the position of the carrying source, and is a point where the carrying is started by lifting the suspended load 200. The end point $P_e$ corresponds to an example of information pertaining to the position of the carrying destination, and is a point where the suspended load 200 is carried and then the carrying is ended. In general, the coordinates of the point are represented by a latitude/longitude coordinate system, a plane rectangular coordinate system, or the like, and are represented by an X value, a Y value, and a Z value of the plane rectangular coordinate system of each of the start point $P_s$ and the end point $P_e$. The coordinates of the point may be global coordinates or local coordinates.

The load $m_r$ of the suspended load 200 corresponds to an example of information pertaining to the load of the suspended load, and means a total load obtained by adding a load of a suspension tool such as a hook or a hook block of the rough terrain crane 100 to the load of the suspended load 200 scheduled to be carried in crane work.

The work region M corresponds to an example of information pertaining to the work region, and as illustrated in FIG. 4, the work region M is a region where work can be performed at a site where crane work including the start point $P_s$ and the end point $P_e$ is scheduled. In other words, the work region M is a region where the rough terrain crane 100 in the site can be stopped and the outrigger 130 can be extended. The work region M is represented by X values and Y values of a plane rectangular coordinate system of a plurality of points on the outer periphery thereof.

The turning efficiency $P_r$, the derricking efficiency $P_l$, and the winch efficiency $P_w$ each correspond to an example of information pertaining to the operation efficiency of the mobile crane, and are the work amounts of the operations of the turning body 111, the boom 120, and the winch 112 with respect to the energy supplied to the power sources of the turning body 111, the boom 120, and the winch 112, respectively.

The air temperature T is a temperature in the work region M on the date and time when the scheduled crane work is performed. The air temperature T is represented by an average temperature measured at the work site or an average temperature of the work region M obtained from a weather forecast.

The wind speed W is a scalar value when the strength and direction of the wind are represented by a vector. The wind direction $V_{XYZ}$ is a unit vector of the vector. The wind speed W and the wind direction $V_{XYZ}$ are expressed by an average wind speed and an average wind direction for 10 minutes measured at the work site or obtained from a weather forecast. The wind direction $V_{XYZ}$ is represented by an X value and a Y value in the plane rectangular coordinate system.

When such a data set 11 is input, the input unit 10 transmits the data set 11 to the determination unit 20 illustrated in FIG. 2.

The determination unit 20 has a learning model, and determines the placement position of the mobile crane based on the output of the learning model. It includes the neural network unit 21 that obtains information for determining the stop position of the traveling body 110 and the extension position of the outrigger 130 based on the data set 11 received from the input unit 10, and a calculation unit 22 that determines the stop position of the traveling body 110 and the extension position of the outrigger 130 based on the information obtained by the neural network unit 21.

The position determination device 1 includes a computer including a memory 310, an auxiliary memory 330, and a central processing unit (CPU) 320 illustrated in FIG. 5. The neural network unit 21 is implemented by the CPU 320 executing a neural network program 311 stored in the memory 310.

The neural network unit 21 corresponds to an example of a learning model and includes a plurality of nodes 211 called neurons as illustrated in FIG. 6. The nodes 211 form an input layer 212, a hidden layer 213, and an output layer 214. Then, the node 211 and the node 211 are coupled. The learning model is a model that performs learning so as to output information pertaining to the optimum placement position of the mobile crane with respect to the working condition based on the reward function including at least one evaluation function pertaining to the crane work.

Note that, in FIG. 6, the output layer 214 having two nodes 211 is illustrated for easy understanding, but the number of nodes 211 of the output layer 214 is the number obtained by adding the number of candidates for the stop position $P_o$ at which the traveling body 110 is stopped to the number of candidates for the extension position $R_o$ at which each of the four outriggers 130 extends.

The coupling strength between the nodes 211 is weighted by θ. The weight θ is assigned by the above-described neural network program 311 reading a parameter database 25 stored in the auxiliary memory 330 illustrated in FIG. 5. As a result, the neural network unit 21 illustrated in FIG. 6 constructs a learned model that has learned the law for determining the stop position $P_o$ of the traveling body 110 and the extension position $R_o$ of the outrigger 130.

The data set 11 received from the input unit 10 is input to the input layer 212.

The input layer 212, the hidden layer 213 and the output layer 214 perform information processing for determining the stop position Po of the traveling body 110 and the extension position Ro of the outrigger 130 by the above-described learned model when the data set 11 is input to the input layer 212. The input layer 212, the hidden layer 213, and the output layer 214 approximate an action value function Q of the reinforcement learning as described later. Therefore, the output layer 214 outputs the action value of the action value function Q.

Specifically, the output layer 214 outputs the action value when the stop position $P_o$ of the traveling body 110 is set to a specific position. In addition, it outputs the action value when the extension position $R_o$ of the outrigger 130 is set to a specific position.

Here, the placement position (stop position $P_o$) of the traveling body 110 refers to a position of the turning center of the turning body 111 illustrated in FIG. 1.

The placement positions (extension positions $R_o$) of the outriggers 130 refer to the positions $r_1$, $r_2$, $r_3$, and $r_4$ of the center of the float 133 of the outriggers 130 in plan view when the four outriggers 130 are extended as illustrated in FIG. 4. The extension position $R_o$ may be absolute coordinates or relative coordinates with respect to the stop position $P_o$ of the traveling body 110.

For example, when the work region M is divided into square-shaped small regions, the output layer 214 outputs the action value at the time of setting the stop position $P_o$ of the traveling body 110 to each of the small regions. In addition, the output layer 214 outputs the action value when the outriggers 130 protrude the respective small regions. The output of the output layer 214 is transmitted to the calculation unit 22. The action value that is the output of the output layer 214 corresponds to an example of information pertaining to the placement position of the mobile crane. In addition, the action value that is the output of the output layer 214 corresponds to an example of information pertaining to the placement position of the outrigger. In addition, the action value having the highest value regarding the placement position of the mobile crane among the outputs of the output layer 214 corresponds to an example of information pertaining to the optimum placement position of the mobile crane. In addition, the action value having the highest value regarding the placement position of the outrigger among the outputs of the output layer 214 corresponds to an example of information pertaining to the optimum placement position of the outrigger.

Returning to FIG. 2, the calculation unit 22 is implemented by the CPU 320 executing a position determination program 313 stored in the memory 310 illustrated in FIG. 5.

The calculation unit 22 selects the vehicle stop position $P_o$ and the extension position $R_o$ having the highest values from the data of the action values related to the vehicle stop position $P_o$ and the extension position $R_o$ received from the output layer 214. Then, the calculation unit 22 sets the selected stop position $P_o$ and extension position $R_o$ as the stop position $P_o$ of the traveling body 110 and the extension position $R_o$ of the outrigger 130. As a result, the calculation unit 22 determines the stop position $P_o$ of the traveling body 110 and the extension position $R_r$ of the outrigger 130.

Further, in order to make it easy for the operator to operate the rough terrain crane 100, the calculation unit 22 calculates the orientation of the traveling body 110 with respect to the determined stop position $P_o$ and the extension width of the outrigger 130 from the determined extension position $R_o$ of the outrigger 130. The calculation unit 22 transmits, to the output unit 30, data of the determined stop position $P_o$ of the traveling body 110, the calculated orientation of the traveling body 110, and the extension width of the outrigger 130.

The output unit 30 corresponds to an example of a notification unit and includes a liquid crystal display. When receiving the stop position $P_o$ of the traveling body 110, the orientation of the traveling body 110, and the extension width of the outrigger 130 from the calculation unit 22, the output unit 30 displays, on the liquid crystal display, the stop position $P_o$ of the traveling body 110, the orientation of the traveling body 110, the extension position of the outrigger 130, and the extension width of the outrigger 130 that were received. As a result, the output unit 30 notifies the operator of the rough terrain crane 100 of the stop position $P_o$ of the traveling body 110, the orientation of the traveling body 110, the extension position of the outrigger 130, and the extension width of the outrigger 130 that are desired. As a result, the position determination device 1 makes it possible for the operator to stop the traveling body 110 at an appropriate position and extend the outrigger 130 by an appropriate extension width.

As described above, the neural network unit 21 of the determination unit 20 constructs a learned model in which the neural network program 311 has learned the law for determining the stop position $P_o$ of the traveling body 110 and the extension position $R_o$ of the outrigger 130 by reading the weight θ stored in the parameter database 25. The position determination device 1 includes the learning unit 40 in order to create the learned model or to improve the accuracy of determination of the stop position $P_o$ and the extension position $R_o$ by the learned model.

The learning unit 40 is implemented by the CPU 320 executing a learning program 312 stored in the memory 310 illustrated in FIG. 5 included in the position determination device 1.

The learning unit 40 causes the neural network unit 21 illustrated in FIG. 2 to perform deep reinforcement learning to generate a learned model that has learned the law for determining the stop position $P_o$ of the traveling body 110 and the extension position $R_o$ of the outrigger 130.

Here, deep reinforcement learning is learning in which reinforcement learning called Q learning is combined with deep learning. Here, in the reinforcement learning, in a case where the possible action at is selected in the state $s_t$ at the time t, and the reward when the state is the state $s_{t+1}$ is defined as a reward function $R(s_t, a_t, s_{t+1})$ and the value of the action is defined as an action value function $Q(s_t, a_t)$, the action value function $Q(s_t, a_t)$ is optimized so that the cumulative value of the reward is maximized. On the other hand, deep reinforcement learning is a learning method in which the action value function $Q(s_t, a_t)$ of the above-described reinforcement learning is represented by a neural network by using deep learning, and is optimized by back propagation, that is, an error back propagation method. Note that the action value function $Q(s_t, a_t)$ is hereinafter simply referred to as an action value function Q.

Describing the learning unit 40 in detail, the learning unit 40 reads the learning database 45. The auxiliary memory 330 illustrated in FIG. 5 stores the learning database 45. The learning database 45 stores a plurality of sets of data sets 46 illustrated in FIG. 7, which are created from building information modeling (BIM) data, design data of the rough terrain crane 100, weather data, and the like, and are configured by the data of the coordinates of the start point $P_s$ and the end point $P_e$, the load $m_z$ of the suspended load 200, the work region M, the operation efficiency (for example, turning efficiency $P_r$, derricking efficiency $P_l$, and winch efficiency $P_w$) of the rough terrain crane 100, the air temperature T, the wind speed W, and the wind direction $V_{XYZ}$, as in the data sets 11. The learning unit 40 reads the learning database 45 and samples a plurality of sets of data sets 46 from the learning database 45.

As the state $s_t$ described above, the learning unit 40 inputs each of the plurality of sets of sampled data sets 46 to the input layer 212 of the neural network unit 21 illustrated in FIG. 6.

As described above, the input layer 212, the hidden layer 213, and the output layer 214 represent the action value function of the action for determining the stop position $P_o$ of the traveling body 110 and the extension position $R_o$ of the outrigger 130 as the action value function Q in the combined form of the neural network. As a result, the output layer 214 outputs, for each data set 46 input to the input layer 212, an action value when the stop position $P_o$ of the traveling body 110 is set to a specific position and an action value when the extension position $R_o$ of the outrigger 130 is set to a specific position.

The learning unit 40 calculates a reward value by applying each piece of data of the data sets 46 input to the input layer 212 and the above-described action value data output from the output layer 214 to a reward function J(•) expressed by the following Expressions 1-6. The reward value is calculated for each of the data sets 46 input to the input layer 212.

Here, the reward function J(•) is a function expressed by the following Expression 1 where J(Work) is an operation efficiency evaluation function is, J(Path) is a path evaluation function is, J(Pos) is a region evaluation function is, and J(OR) is a stability evaluation function. Each of the operation efficiency evaluation function J(Work), the path evaluation function J(Path), the region evaluation function J(Pos), and the stability evaluation function J(OR) corresponds to an example of an evaluation function pertaining to the crane work. The reward function J(•) may include at least one evaluation function among the operation efficiency evaluation function J(Work), the path evaluation function J(Path), the region evaluation function J(Pos), and the stability evaluation function J(OR).

[Math 1]

$$J(\cdot) = J(\text{Work}) + J(\text{Path}) + J(Pos) + J(OR) \because \lim J(\cdot) = R \qquad \text{Expression 1}$$

The operation efficiency evaluation function J(Work) is a function of evaluating the operation efficiency of the mobile crane. The operation efficiency evaluation function J(Work) is an evaluation function expressed by the following Expression 2 where $P_r$ is a turning efficiency, $P_l$ is a derricking efficiency, $P_w$ is a winch efficiency, and $K_r$, $K_l$, and $K_w$ are environmental coefficients indicating the influence of wind and temperature on the turning efficiency $P_r$, the derricking efficiency $P_l$, and the winch efficiency $P_w$. In the present specification, the operation efficiency evaluation function J(Work) is also referred to as a crane operation efficiency function.

[Math 2]

$$J(\text{Work}) = K_r \cdot P_r + K_l \cdot P_l + K_w \cdot P_w \qquad \text{Expression 2}$$

Note that the environmental coefficients $K_r$, $K_l$, and $K_w$ are proportional to the reciprocals of the wind speed W, the wind direction $V_{XYZ}$, and the air temperature T, respectively. For example, when the wind represents almost no wind, the influence of the wind on the turning, derricking, and the like is small, and thus, the environmental coefficients $K_r$, $K_l$, and $K_w$ are the numerical value 1.

The path evaluation function J(Path) is a function of evaluating the carrying path of the load. The path evaluation function J(Path) is a function that evaluates a carrying path when crane work of carrying the suspended load 200 from the start point $P_s$ to the end point $P_e$ is performed with a change rate of the working radius. Specifically, the path evaluation function J(Path) is expressed by the following Expression 3 where a and b (where a≥b) are the chord lengths illustrated in FIG. 4 of the arc passing through the start point $P_s$ and the end point $P_e$ with the stop position $P_o$ of the traveling body 110 as the center point. In the present specification, the path evaluation function J(Path) is also referred to as a boom telescopic efficiency function because it indicates the efficiency of telescoping of the boom 120. The path evaluation function J(Path) and the operation efficiency evaluation function J(Work) as a whole are also referred to as an operation efficiency function of the crane.

[Math 3]

$$J(\text{Path}) = \frac{b}{a} \qquad \text{Expression 3}$$

The region evaluation function J(Pos) is a function of evaluating appropriateness of the placement position of the mobile crane with respect to the work region. The region evaluation function J(Pos) is an evaluation function expressed by Expression 4 indicating the appropriateness/inappropriateness of the stop position $P_o$ of the traveling body 110 with respect to the work region M.

[Math 4]

$$J(Pos) = \begin{cases} 1, & \text{if } P_0 \in M \\ -1, & \text{if } P_0 \notin M \end{cases} \qquad \text{Expression 4}$$

The stability evaluation function J(OR) is a function of evaluating appropriateness of the placement position of the mobile crane in consideration of the extension state of the outrigger. The stability evaluation function J(OR) is an evaluation function expressed by the following Expression 5 where Rw is a maximum working radius at the extension position $R_o$ of the outrigger 130 and m is a rated total load that can be suspended in the posture during the crane work. In the present specification, it is also referred to as a function representing appropriateness/inappropriateness of the stop position $P_o$ with respect to the maximum working radius Rw at the extension position $R_o$.

[Math 5]

$$J(OR) = \begin{cases} 1, & \text{if } P_o \cdot \text{MAX}(P_S, P_e) < R_W, \text{ and } m_r < m \\ -1, & \text{if } P_\theta \cdot \text{MAX}(P_S, P_e) < R_W, \text{ or } m_r \geq m \end{cases} \qquad \text{Expression 5}$$

The learning unit 40 calculates a target value to be output from the output layer 214 for each data set 46 using the reward value obtained from the reward function J(•). For example, in the example of the action value function Q, the learning unit 40 calculates the target value using the following Expression 6. Then, the learning unit 40 updates the weight θ of the coupling strength between the nodes 211 from the error between the target value and the output of the output layer 214 for each data set 46. At this time, the learning unit 40 updates the weight θ of the output layer 214 based on Expression 7. Further, the weights of the hidden layer 213 and the input layer 212 are updated by an error back propagation method. As a result, the learning unit 40 causes the neural network unit 21 to perform deep reinforcement learning.

[Math 6]

$$t = J(\cdot) + \gamma \max Q(s_t, a_t; \theta) \qquad \text{Expression 6}$$

[Math 7]

$$\theta_{t+1} \leftarrow \theta_t + \alpha \nabla_\theta \bar{J}(\cdot) \qquad \text{Expression 7}$$

where t in Expression 6 is a target value, and γ is a discount rate. α in Expression 7 is a learning rate. J(•) is a reward function of Expression 1.

The learning unit 40 repeats a series of processing until sampling of all data sets 46 from the learning database 45 is completed. That is, a series of operations including sampling the data sets 46 from the learning database 45, inputting the sampled data set 46 to the input layer 212, calculating the reward value and the target value, and updating the weight θ of the coupling strength between the nodes 211 from the error is repeated.

When the sampling of all the data sets 46 is completed, the learning unit 40 stops the deep reinforcement learning. As a result, a learned model that has learned the above-described law for determining the stop position $P_o$ of the traveling body 110 and the extension position $R_o$ of the outrigger 130 is generated. When the learned model is generated, the learning unit 40 stores the weight θ of the coupling strength between the nodes 211 in the parameter database 25.

In the position determination device 1, the neural network program 311 reads the weight θ stored by the learning unit 40, so that a learned model that has learned the law for determining the stop position $P_o$ of the traveling body 110 and the extension position $R_o$ of the outrigger 130 is constructed in the neural network unit 21. This learned model (learning model) has a function of outputting information pertaining to the optimum placement position of the mobile crane with respect to the working condition. As a result, the determination unit 20 can determine the stop position $P_o$ of the traveling body 110 and the extension position $R_o$ of the outrigger 130 from the data set 11 input to the input unit 10 using the learned model.

Next, the position determination process performed by the position determination device 1 will be described with reference to FIGS. 8 and 9. In the following description, it is assumed that a power button (not illustrated) is provided in the position determination device 1, and power is supplied from the power source to the position determination device 1 by turning on and off the power button. In addition, it is assumed that the operator of the rough terrain crane 100 stores the learning database 45 in the auxiliary memory 330 or stores the parameter database 25 before using the position determination device 1.

Figure 8:
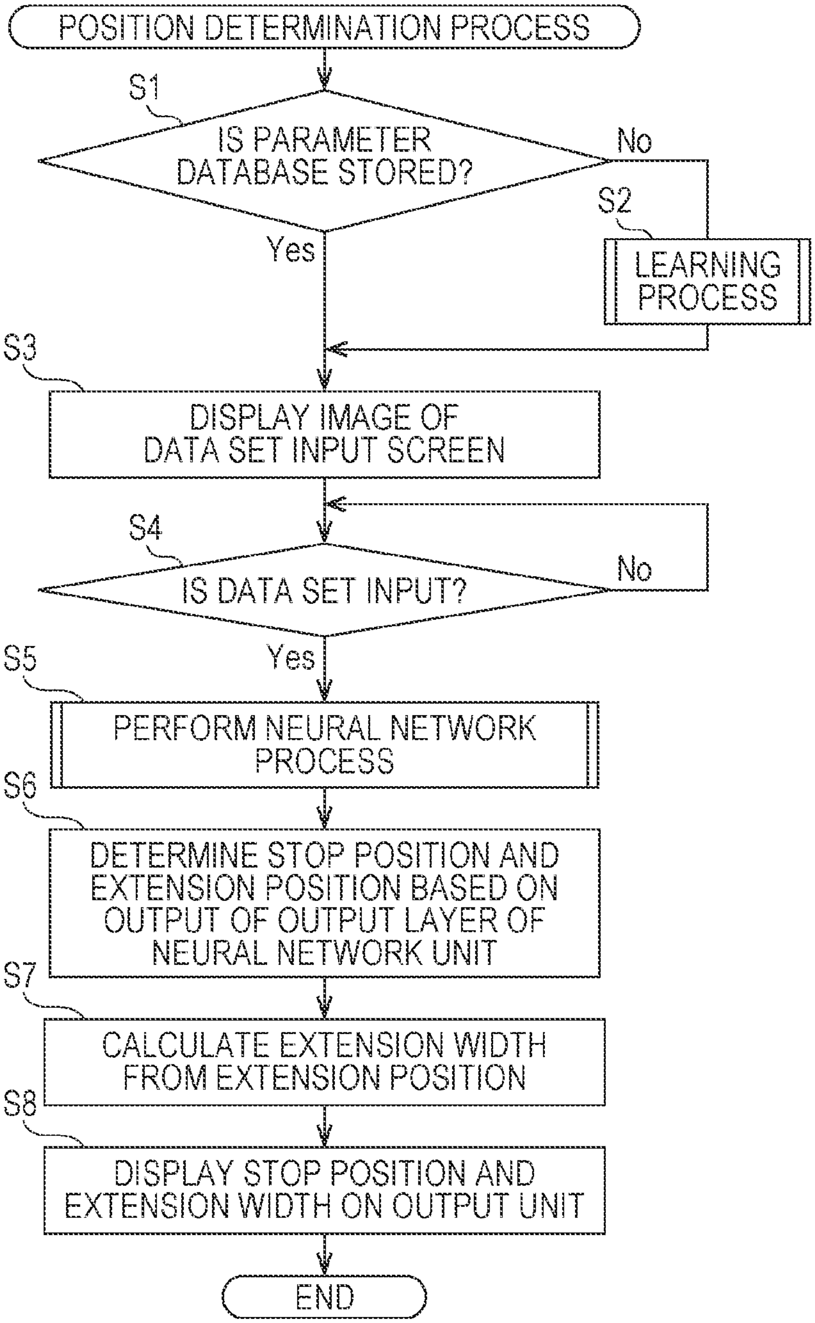
FIG. 8 is a flowchart of a position determination process performed by the position determination device according to the embodiment of the present invention.

FIG. 8 is a flowchart of a position determination process performed by the position determination device 1 according to the embodiment. FIG. 9 is a flowchart of a learning process performed by the position determination device 1.

First, the operator of the rough terrain crane 100 presses the power button of the position determination device 1 to activate the position determination device 1 itself. As a result, the position determination program 313 is executed by the CPU 320. As a result, the flow of the position determination process is started.

When the flow of the position determination process is started, the determination unit 20 first determines whether the parameter database 25 is stored in the auxiliary memory 330 as illustrated in FIG. 8 (step S1).

When it is determined that the parameter database 25 is not stored (No in step S1), the determination unit 20 activates the learning program 312 and performs a learning process (step S2).

Figure 9:
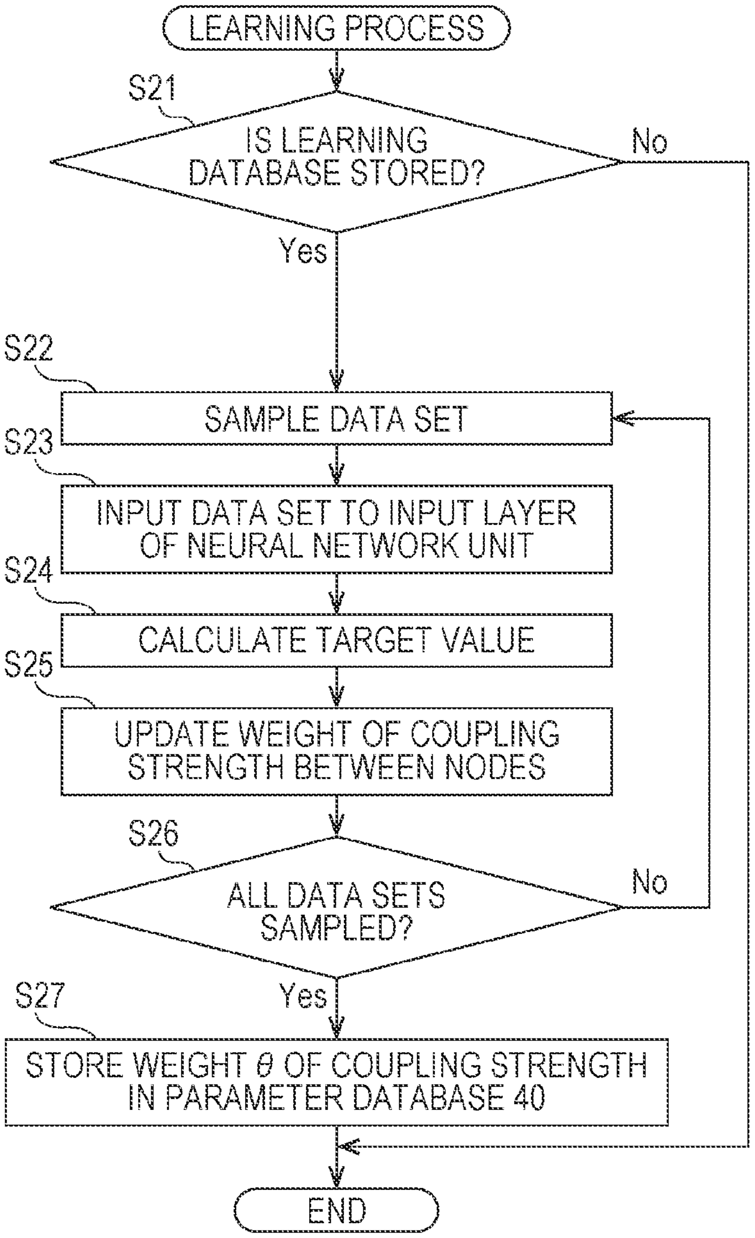
FIG. 9 is a flowchart of a learning process performed by the position determination device according to the embodiment of the present invention.

When the flow of the learning process is started, the determination unit 20 first determines whether the learning database 45 is stored in the auxiliary memory 330 as illustrated in FIG. 9 (step S21).

When it is determined that the learning database 45 is not stored (No in step S21), the determination unit 20 ends the learning process and displays, on the liquid crystal display included in the output unit 30, an error indicating that the learning database 45 does not exist.

On the other hand, when it is determined that the learning database 45 is stored (Yes in step S21), the determination unit 20 samples a plurality of pieces of data sets 46 from the learning database 45 (step S22).

Next, the determination unit 20 inputs the sampled data sets 46 to the input layer 212 of the neural network unit 21 (step S23). Subsequently, the determination unit 20 calculates a target value using the reward function J(•) (step S24).

The determination unit 20 calculates an error with the output layer 214 from the calculated target value and updates the weight θ of the coupling strength between the nodes 211 (step S25).

Next, the determination unit 20 determines whether all the data sets 46 have been sampled from the learning database 45 (step S26).

When determining that not all the data sets 46 have been sampled (No in step S26), the process returns to step S22 and the determination unit 20 continues the deep reinforcement learning of the neural network unit 21.

On the other hand, when determining that all the data sets 46 have been sampled (Yes in step S26), the determination unit 20 stores the weight θ of the coupling strength between the nodes 211 in the parameter database 25 (step S27). Subsequently, the learning process is terminated, and the process returns to the flow of the position determination process. Then, the process proceeds to step S3 of the position determination process.

Returning to the flow of the position determination process shown in FIG. 8, in step S1, in a case where the learning process is not performed, that is, in a case where it is determined that the parameter database 25 is stored (Yes in step S1), the determination unit 20 causes the liquid crystal display included in the output unit 30 to display the image of the input screen for inputting the data set 11 (step S3). As a result, the operator of the rough terrain crane 100 is prompted to input the data set 11.

At this time, in order to facilitate the input, map data may be stored in advance in the auxiliary memory 330, and a map image based on the map data may be displayed on the liquid crystal display of the output unit 30. Then, it is preferable that the work region M of the data set 11 can be input by the keypad included in the input unit 10.

The operator of the rough terrain crane 100 inputs each data of the data sets 11 using the touch panel of the input unit 10.

After displaying the image of the input screen on the liquid crystal display of the output unit 30, the determination unit 20 determines whether the data set 11 is input to the input unit 10 (step S4).

When it is determined that the data set 11 is input to the input unit 10 (Yes in step S4), the determination unit 20 activates the neural network program 311 and performs a neural network process (step S5). At this time, the determination unit 20 reads the weight θ of the coupling strength between the nodes 211 from the parameter database 25, and constructs a learned model that has learned the law for determining the stop position $P_o$ of the traveling body 110 and the extension position $R_o$ of the outrigger 130.

On the other hand, when it is determined that the data set 11 is not input to the input unit 10 (No in step S4), the process returns to step S4 and it waits until the data set 11 is input to the input unit 10.

When the neural network process is performed (step S5), the determination unit 20 inputs each data of the data sets 11 to the input layer 212 of the neural network unit 21. As a result, the action value when the stop position $P_o$ of the traveling body 110 is set to a specific position and the action value when the extension position $R_o$ of the outrigger 130 is set to a specific position are output from the output layer 214 of the neural network unit 21. Then, the outputs thereof are transmitted to the calculation unit 22 included in the determination unit 20.

When the outputs of the neural network unit 21 is transmitted, the calculation unit 22 determines the stop position $P_o$ of the traveling body 110 and the extension position $R_o$ of the outrigger 130 based on the output of the neural network unit 21 (step S6). Specifically, the calculation unit 22 selects the stop position $P_o$ of the traveling body 110 and the extension position $R_o$ of the outrigger 130 indicating the highest action value among the action values output by the output layer 214 of the neural network unit 21. As a result, the calculation unit 22 determines the stop position $P_o$ of the traveling body 110 and the extension position $R_o$ of the outrigger 130.

In the present specification, steps S5 and S6 are also referred to as determination steps.

Next, the calculation unit 22 calculates the orientation of the traveling body 110 with respect to the stop position $P_o$ determined from the determined extension position $R_o$ of the outrigger 130 and the extension width of the outrigger 130 (step S7).

Subsequently, the calculation unit 22 displays the determined stop position $P_o$ of the traveling body 110, the calculated orientation of the traveling body 110, and the calculated extension width of the outrigger 130 on the liquid crystal display of the output unit 30 (step S8). As a result, the operator of the rough terrain crane 100 can recognize the desired stop position $P_o$ at which the traveling body 110 is stopped and the orientation thereof. Further, at the stop position $P_o$, the outrigger 130 can be extended by a desired extension width. As a result, the operator can stop the rough terrain crane 100 at a position where the efficiency of the crane work is high, and can extend the outrigger 130 by the extension width where the efficiency of the crane work is high.

In the present specification, step S8 is also referred to as an output step.

As described above, in the position determination device 1 according to the present embodiment, the determination unit 20 determines the stop position $P_o$ of the traveling body 110 and the extension position $R_o$ of the outrigger 130 using the learned model, and the learned model is generated by performing deep reinforcement learning of the stop position $P_o$ of the traveling body and the extension position $R_o$ of the outrigger 130 with respect to the data set 46 based on the reward value calculated from the operation efficiency of the rough terrain crane 100 and appropriateness/inappropriateness of the stop position $P_o$ with respect to the start point $P_s$, the end point $P_e$, and the work region M when the crane work of moving the suspended load 200 from the start point $P_s$ to the end point $P_e$ is performed at the stop position $P_o$ and the extension position $R_o$.

Therefore, the determination unit 20 can determine the stop position $P_o$ of the traveling body 110 at which the efficiency of the crane work is high. In addition, the extension position $R_o$ of the outrigger having high efficiency of the crane work can be obtained. As a result, the rough terrain crane 100 can be installed at a position where efficiency of crane work is high.

Although the embodiments of the present invention have been described above, the present invention is not limited to the above embodiments. For example, in the above embodiment, the position determination device 1 includes the learning unit 40. However, the present invention is not limited thereto. In the position determination device 1, the determination unit 20 may determine the stop position $P_o$ of the traveling body 110 and the extension position $R_o$ of the outrigger 130 using the learned model described in the embodiment.

Figure 10:
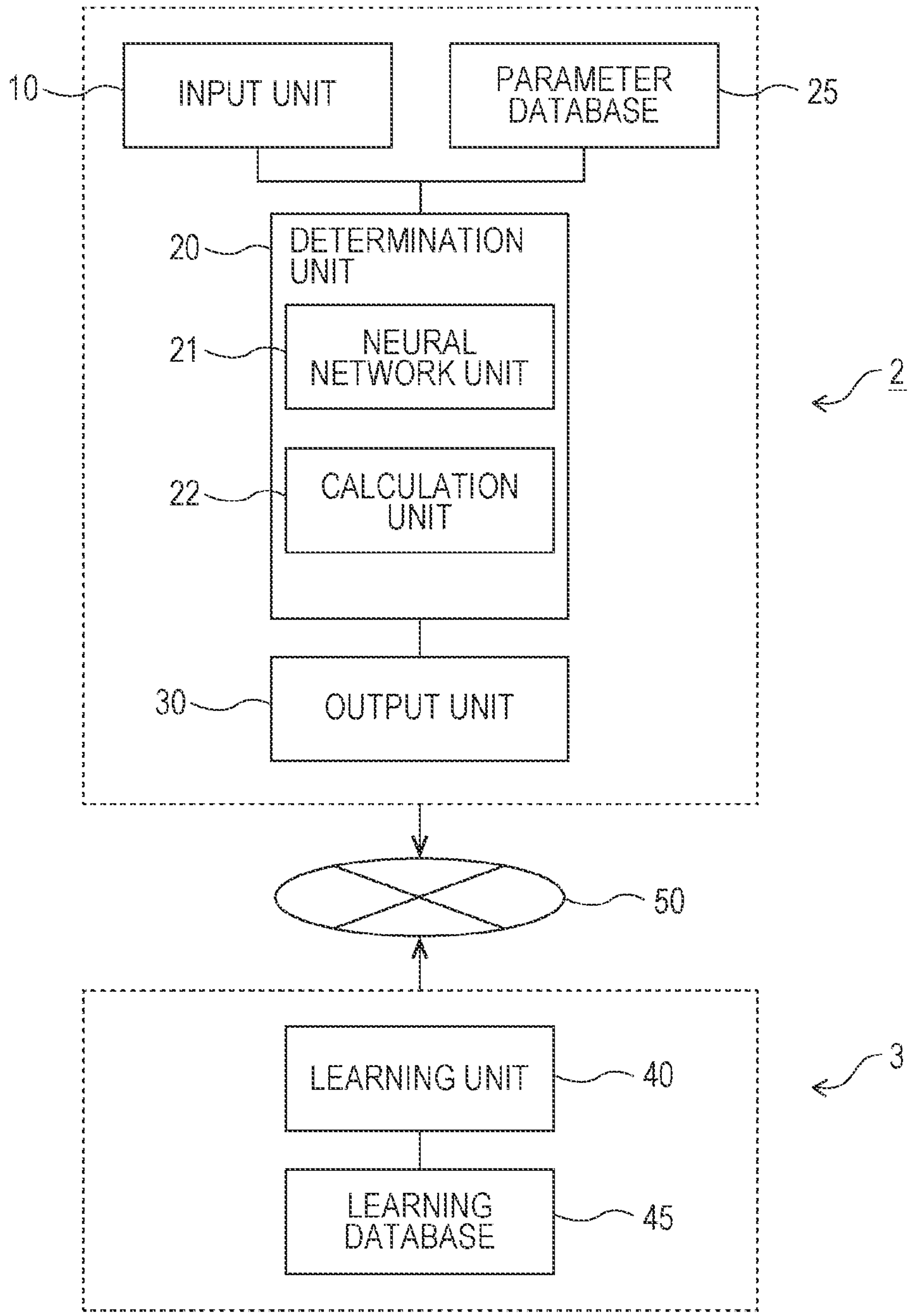
FIG. 10 is a functional block diagram of a position determination device according to another embodiment of the present invention.

FIG. 10 is a functional block diagram of a position determination device 2 according to another embodiment.

As illustrated in FIG. 10, the position determination device 2 includes the input unit 10, the determination unit 20, and the output unit 30 described in the embodiment, but does not include the learning unit 40. Although not illustrated, the determination unit 20 includes a wireless communication module.

On the other hand, the learning unit 40 is provided in a server 3 connected to the wireless communication module of the determination unit 20 via a network 50. Then, the learning unit 40 can generate the learned model described in the embodiment by causing the neural network unit 21 of the determination unit 20 to perform deep reinforcement learning via the wireless communication module. Furthermore, after generating the learned model, the learning unit 40 can store the weight θ of the coupling strength between the nodes 211 in the parameter database 25 via the wireless communication module.

As described above, the position determination device 1, 2 may not include the learning unit 40. When the position determination device 1, 2 does not include the learning unit 40, the weight θ may be stored in the parameter database 25.

In the above embodiment, the determination unit 20 includes the neural network unit 21. However, the present invention is not limited thereto. The determination unit 20 may determine the stop position $P_o$ and the extension position $R_o$ by using a learned model generated by performing reinforcement learning on the start point $P_s$, the end point $P_e$, the load $m_r$ of the suspended load 200, the work region M, and the stop position $P_o$ of the traveling body 110 and the extension position $R_o$ of the outrigger 130 with respect to the data of the operation efficiency. Since the learned model is only required to be generated by reinforcement learning, the determination unit 20 does not need to include the neural network unit 21. The learned model may be subjected to reinforcement learning by Q learning, Sarsa, or a Monte Carlo method other than deep reinforcement learning.

In the above embodiment, the air temperature T, the wind speed W, and the wind direction $V_{XYZ}$ of the work region M are input to the input unit 10, and the learning unit 40 inputs the air temperature T, the wind speed W, and the wind direction $V_{XYZ}$ to the input layer 212 of the neural network unit 21 to perform deep reinforcement learning. However, the present invention is not limited thereto. In the position determination device 1, 2, data of the air temperature T, the wind speed W, and the wind direction $V_{XYZ}$ may be required or may not be required. For example, when the air temperature T is a normal temperature and the wind speed W is less than 0.3 m/s as a result of substantially no wind, there is little influence on the turning efficiency $P_r$ of the turning body 111, the derricking efficiency $P_l$ of the boom 120, and the winch efficiency $P_w$ of the winch 112 in the crane work. Therefore, on the premise of a normal temperature and no wind, the learning unit 40 may generate a learned model, and the determination unit 20 may determine the stop position $P_o$ and the extension position $R_o$ using the learned model. In this case, the environmental coefficients $K_r$, $K_l$, and $K_w$ of Equation 2 each may be fixed to the numerical value 1, and the operation efficiency evaluation function J(Work) may be obtained.

In the present specification, the operation efficiency evaluation function J(Work) when the environmental coefficients $K_r$, $K_l$, and $K_w$ of Expression 2 are constants having a magnitude of 1 is referred to as a first operation efficiency function, and the operation efficiency evaluation function J(Work) when the environmental coefficients $K_r$, $K_l$, and $K_w$ of Expression 2 are variables is referred to as a second operation efficiency function.

In the above embodiment, the position determination device 1, 2 is mounted on the rough terrain crane 100, but the position determination device 1, 2 is applicable to any mobile crane including the traveling body 110 and the outrigger 130. For example, the position determination device 1, 2 is applicable to an all-terrain crane and a truck crane.

INDUSTRIAL APPLICABILITY

The dynamic lift-off control device according to the present invention can be applied not only to the rough terrain crane but also to various mobile cranes.

REFERENCE SIGNS LIST

1, 2 position determination device
3 server
10 input unit
11 data set
20 determination unit
21 neural network unit
22 calculation unit
22 parameter database
30 output unit
40 learning unit
45 learning database
46 data set
50 network
100 rough terrain crane
110 traveling body
111 turning body
112 winch
120 boom
121 boom head
130 outrigger
131 beam
132 jack
133 float
200 suspended load
211 node
212 input layer
213 hidden layer
214 output layer
310 memory
311 neural network program
312 learning program
313 position determination program
320 CPU
330 auxiliary memory
a, b chord length
M work region
T temperature
W wind speed
$V_{XYZ}$ wind direction
$r_1$-$r_4$ position
$P_s$ start point
$P_e$ end point
$P_o$ stop position
$R_o$ extension position

The invention claimed is:

1. A crane position determination device mounted on a mobile crane including a travelling body and outriggers, the crane position determination device comprising:

an input unit that receives an input of a working condition of crane work, wherein the input unit receives environmental data measured at a work site;

a determination unit that has a learning model and that determines a placement position of the mobile crane based on an output of the learning model; and a notification unit that provides notification of the placement position of the mobile crane, wherein the learning model is a model that learns to output information pertaining to an optimum placement position of the mobile crane with respect to the working condition based on a reward function including at least one evaluation function pertaining to the crane work, wherein the learning model is a neural network executing a neural network program and including a plurality of nodes forming an input layer, a hidden layer, and an output layer, a number of nodes of the output layer is a number obtained by adding a number of candidates for a stop position at which the traveling body is stopped to a number of candidates for an extension position at which each of the outriggers extend, wherein a coupling strength between the nodes of the output layer is weighted by θ assigned by the neural network program reading a parameter database, wherein the at least one evaluation function pertaining to the crane work includes an operation efficiency evaluation function of evaluating operation efficiency of the mobile crane, wherein the operation efficiency evaluation function J(Work) is calculated as J(Work)=(Kr×Pr)+(Kl×Pl)+(Kw×Pw), where Pr is turning efficiency of a turning body, Pl is derricking efficiency of a boom, Pw is winch efficiency of a winch, and Kr, Kl, and Kw are environmental coefficients, a path evaluation function of evaluating a carrying path of a load, wherein the path evaluation function J(Path) is calculated as J(Path)=a/b where a and b are chord lengths of an arc passing through a carrying source position and a carrying destination position with the stop position as a center point, and a region evaluation function of evaluating appropriateness of a placement position of the mobile crane with respect to a work region, wherein the region evaluation function J(Pos) indicates the appropriateness of the stop position with respect to the work region, wherein the environmental coefficients Kr, Kl, and Kw in the operation efficiency evaluation function J(Work) are calculated based on the environmental data to account for environmental effects on the turning efficiency of the turning body, the derricking efficiency of the boom, and the winch efficiency of the winch, and wherein the input unit, the determination unit, and the notification unit are each implemented via at least one processor.

2. The crane position determination device according to claim 1, wherein the at least one evaluation function further includes a stability evaluation function of evaluating appropriateness of a placement position of the mobile crane in consideration of an extension state of an outrigger.

3. The crane position determination device according to claim 1, wherein the working condition includes information pertaining to a position of a carrying source, information pertaining to a position of a carrying destination, information pertaining to a load of a suspended load, information pertaining to a work region, and information pertaining to operation efficiency of the mobile crane.

4. The crane position determination device according to claim 3, wherein the operation efficiency is calculated based on turning efficiency of a turning body, derricking efficiency of a boom, telescopic efficiency of the boom, and winch efficiency of a winch.

5. The crane position determination device according to claim 3, wherein the working condition further includes information pertaining to an environment of the work region.

6. The crane position determination device according to claim 1, wherein the learning model outputs information pertaining to an optimum placement position of an outrigger with respect to the working condition, wherein the determination unit determines a placement position of the outrigger based on an output of the learning model, and wherein the notification unit provides notification of the placement position of the outrigger together with a placement position of the mobile crane.

7. The crane position determination device according to claim 6, wherein the determination unit determines an orientation of the mobile crane and/or an extension width of the outrigger based on the determined placement position of the outrigger, and wherein the notification unit outputs the orientation of the mobile crane and/or the extension width of the outrigger.

8. A mobile crane comprising:

the crane position determination device according to claim 1.

9. A crane position determination method executed by a computer mounted on a mobile crane including a travelling body and outriggers, the crane position determination method comprising:

receiving an input of a working condition of crane work, wherein the input includes environmental data measured at a work site;

determining a placement position of the mobile crane based on an output of a learning model that learns to output information pertaining to an optimum placement position of the mobile crane with respect to the working condition based on a reward function including at least one evaluation function pertaining to the crane work; and providing notification of the placement position of the mobile crane, wherein the learning model is a neural network executing a neural network program and including a plurality of nodes forming an input layer, a hidden layer, and an output layer, a number of nodes of the output layer is a number obtained by adding a number of candidates for a stop position at which the traveling body is stopped to a number of candidates for an extension position at which each of the outriggers extend, wherein a coupling strength between the nodes of the output layer is weighted by θ assigned by the neural network program reading a parameter database, and wherein the at least one evaluation function pertaining to the crane work includes an operation efficiency evaluation function of evaluating operation efficiency of the mobile crane, wherein the operation efficiency evaluation function J(Work) is calculated as $J(Work)=(Kr \times Pr)+(Kl \times Pl)+(Kw \times Pw)$, where Pr is turning efficiency of a turning body, Pl is derricking efficiency of a boom, Pw is winch efficiency of a winch, and Kr, Kl, and Kw are environmental coefficients, a path evaluation function of evaluating a carrying path of a load, wherein the path evaluation function J(Path) is calculated as $J(Path)=a/b$ where a and b are chord lengths of an arc passing through a carrying source position and a carrying destination position with the stop position as a center point, and a region evaluation function of evaluating appropriateness of a placement position of the mobile crane with respect to a work region, wherein the region evaluation function J(Pos) indicates the appropriateness of the stop position with respect to the work region, and wherein the environmental coefficients Kr, Kl, and Kw in the operation efficiency evaluation function J(Work) are calculated based on the environmental data to account for environmental effects on the turning efficiency of the turning body, the derricking efficiency of the boom, and the winch efficiency of the winch.

* * * * *